United States Patent
Liston et al.

(10) Patent No.: US 8,807,292 B2
(45) Date of Patent: Aug. 19, 2014

(54) BRAKING SYSTEM FOR A ZIP LINE

(76) Inventors: Pete E. Liston, Corona, CA (US); Mike K. Liston, Corona, CA (US)

( * ) Notice: Subject to any disclaimer, the term of this patent is extended or adjusted under 35 U.S.C. 154(b) by 21 days.

(21) Appl. No.: 13/307,951

(22) Filed: Nov. 30, 2011

(65) Prior Publication Data
US 2012/0145498 A1    Jun. 14, 2012

Related U.S. Application Data

(60) Provisional application No. 61/421,529, filed on Dec. 9, 2010.

(51) Int. Cl.
*B65H 59/16* (2006.01)
*B61H 9/02* (2006.01)
*B60T 7/16* (2006.01)
*A63G 21/20* (2006.01)

(52) U.S. Cl.
CPC ..... *A63G 21/20* (2013.01); *B61H 9/02* (2013.01); *B60T 7/16* (2013.01)
USPC ....... 188/65.1; 188/174; 104/113; 104/117.1; 182/10

(58) Field of Classification Search
USPC .............. 188/378, 379, 380, 65.1, 65.2, 65.3, 188/65.4, 135, 139, 180, 188; 104/112, 104/113, 115, 117.1; 182/10, 11, 192, 193
See application file for complete search history.

(56) References Cited

U.S. PATENT DOCUMENTS

| | | |
|---|---|---|
| 301,923 A | 7/1884 | Reisdorff |
| 387,650 A | 8/1888 | Lovejoy |
| 407,835 A | 7/1889 | Perry et al. |
| 535,938 A | 3/1895 | Boyton |
| 1,087,440 A * | 2/1914 | Freed ................ 182/11 |
| 1,571,096 A | 1/1926 | Rambin et al. |
| 1,831,068 A | 11/1931 | Hayslip |
| 1,859,180 A | 5/1932 | Thiel |
| 3,026,816 A | 3/1962 | Russo et al. |
| 3,040,678 A | 6/1962 | McEwen |
| 3,057,305 A | 10/1962 | Behrens |
| 3,070,035 A | 12/1962 | Russo et al. |
| 3,114,522 A * | 12/1963 | Mortimer ................ 244/110 A |
| 3,827,368 A | 8/1974 | Garnier |
| 3,861,318 A | 1/1975 | Massa |
| 4,062,293 A | 12/1977 | Davis |
| 4,348,960 A | 9/1982 | Staurseth |
| 4,442,918 A | 4/1984 | Rhoads, Sr. |
| 4,458,781 A * | 7/1984 | Ellis et al. ......... 182/5 |

(Continued)

*Primary Examiner* — Robert A Siconolfi
*Assistant Examiner* — Charles Poon
(74) *Attorney, Agent, or Firm* — Kirk A. Buhler; Buhler & Associates

(57) ABSTRACT

Improvements in a braking system for a zip line are presented. Braking occurs when a zip line rider makes contact with a braking carriage that slides along the zip line. The braking carriage pulls on a rope. The rope pulls on a length of chain in a chain reservoir to slide and lift the claim through the chain reservoir. The chain reservoir is an elongated tube that is mounted at an angle. As the zip liner moves further into the landing platform they lift a continuing greater amount of chain from the chain reservoir. The angle of the chain reservoir, coefficient of friction between the chain and the chain reservoir affects the pull-back. After the zip liner comes to a complete stop they remove the carriage from the zip line and gravity returns the brake mechanism. Minimum pull-back makes removal of the cable trolley easier.

18 Claims, 5 Drawing Sheets

(56) References Cited

U.S. PATENT DOCUMENTS

| | | |
|---|---|---|
| 4,474,262 A | 10/1984 | Himmelrich |
| 5,094,171 A | 3/1992 | Fujita |
| 5,224,425 A | 7/1993 | Remington |
| 5,649,866 A | 7/1997 | Balwanz |
| 5,853,331 A | 12/1998 | Ishikawa et al. |
| 5,904,099 A | 5/1999 | Danneker |
| 6,622,634 B2 | 9/2003 | Cylvick |
| 6,666,773 B1 | 12/2003 | Richardson |
| 7,381,137 B2 | 6/2008 | Steele et al. |
| 7,637,213 B2 | 12/2009 | Cylvick |
| 7,699,140 B2 | 4/2010 | Beggrow |
| 8,025,131 B1 * | 9/2011 | Boren .......... 188/165 |
| 8,037,978 B1 * | 10/2011 | Boren .......... 188/156 |
| 2002/0162477 A1 * | 11/2002 | Palumbo .......... 104/87 |
| 2003/0146045 A1 * | 8/2003 | Porter, Jr. .......... 182/11 |
| 2004/0198502 A1 | 10/2004 | Richardson |
| 2006/0027134 A1 * | 2/2006 | Steele et al. .......... 104/113 |
| 2006/0090963 A1 * | 5/2006 | Liao .......... 182/193 |
| 2009/0049946 A1 * | 2/2009 | Buckman .......... 74/502.2 |

\* cited by examiner

BRAKING SYSTEM FOR A ZIP LINE

CROSS REFERENCE TO RELATED APPLICATIONS

This application claims the benefit of Provisional Application Ser. No. 61/421,529 filed Dec. 9, 2010 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a braking system of a zip line. More particularly, the present zip line braking system reduces the speed of a zip liner by lifting chain links from a chain reservoir.

2. Description of Related Art Including Information Disclosed Under 37 CFR 1.97 and 1.98

Zip lines have become more popular as people explore different type of outdoor activities that provide thrilling adventure with reasonable safety. A zip line is essentially a rope or cable that is suspended above the ground. A person attaches themselves to a cable trolley and gravity transports the rider along the rope or cable from a higher platform to a lower platform. One of the major problems with zip lines is stopping the rider once they reach the lower platform. The goal is to provide a controlled gradual stop in the least amount of distance. A number of patents and patent applications are pending and issued to provide solutions to slowing and braking a zip line rider. Exemplary examples of patents and or published applications that have been issued that try to address this problem are identified and discussed below.

U.S. Pat. No. 4,062,293 issued to Joseph I. Davis on Dec. 13, 1977 and U.S. Pat. No. 7,699,140 issued to Denny Beggrow et al., on Apr. 20, 2010 both disclose zip lines that provide no braking system. These patents rely upon the rider to make contact to the lower platform with their feet to slow themselves down. While this braking, or lack thereof, may work for limited spans of distance and speed, many zip line riders are looking for the thrill of longer zip lines at greater speeds. Relying upon just the rider to create their own braking can result in injury and harm to a rider that is not experienced with the abrupt stop that can occur at the conclusion of a zip line ride.

U.S. Pat. No. 407,835 issued to J. B. Perry et al., on Jul. 30, 1889 and U.S. Pat. No. 5,224,425 issued to Bruce Remington on Jul. 6, 1993 both disclose a zip line braking system where the braking system is by slacking the zip line. While creating slack in the zip line will provide a slowing and stopping of the rider, the weight of the rider will have an effect on where the stopping will occur. Because the braking uses a slack point in the cable the ending of the ride will have a decreased speed as the rider slowly rolls to a stop. Another problem with using slack in a zip line is that a rider can ride past the low point on the zip line and will roll backward until the rider stops motion.

U.S. Pat. No. 1,831,068 issued to V. H. Hayslip on Nov. 10, 1931 and U.S. Pat. No. 7,637,213 issued to Eric S. Cylvick on Dec. 29, 2009 both discloses a braking system for use on a cable. The braking system consists of a cable trolley with a compression brake that applies pressure to the cable. The pressure slows the trolley. While these patents disclose a cable braking system they can abrade a cable and further rely upon the rider to apply the brake before the rider makes contact with lower cable support.

U.S. Pat. No. 1,859,180 issued May 17, 1932 to H. A. Thiel discloses a braking system for a cable that uses a compression spring that is placed at the end of travel of the cable. A compression spring provides some braking, but often the coil spring must be supported at both ends to prevent the spring from rubbing on the cable. Multiple springs are also used because the cable will often flex based upon the weight of the rider. Spring(s) usually provide a fairly abrupt stop because soft springs often become fully compressed at the end of travel and hard springs are difficult to compress for light weight riders.

U.S. Pat. No. 7,381,137 issued to Robert L. Steele et al., on Jun. 3, 2008 and published US application 2002/0162477 to Emilliano Palumbo that was published on Nov. 7, 2002 both disclose zip line or cable brakes that rely upon an elastic or bungee cord to provide the braking. The elastomeric cord is either extended across the zip cable or a rider rolls their cable trolley into the elastomeric cord. While this method provides some braking, the braking energy is stored in the elastomeric cord and must be released into the system by moving the rider in the reverse direction.

What is needed is a braking system where the breaking increases as the rider ascends over a lower platform. Braking system must further impart minimal load on the rider as the brake resets. The proposed zip line braking system provides the solution by using chain that is lifted from an angled reservoir whereby the further a rider moves over the stopping platform the amount of braking force increases.

BRIEF SUMMARY OF THE INVENTION

It is an object of the braking system for a zip line for the location for the starting location of the stop to be adjustable. The brake is engaged when a zip liner begins to push on the braking carriage. The braking carriage pulls on a rope leader that is connected to a chain that is lifted from a chain reservoir The adjustment is simply performed by changing the length of the leader and or the location of the chain reservoir. The braking length is also adjustable by changing the length of the reservoir. The longer the chain reservoir the longer the breaking system will be effective.

It is an object of the braking system for a zip line for the amount of braking to be adjustable. The type and size of the chain directly affects the amount of braking. As the zip liner moves further into the landing platform they lift a continuing greater amount of chain from the chain reservoir. The initial amount of chain links may be a single strand, but as more chain is lifted additional strands can be connected to more rapidly increase the braking load.

It is another of the object braking system for a zip line to create a limited amount of pull back on the brake that would pull the zip liner in an undesirable backward direction. The angle of lifting the chain from the reservoir has a direct effect on the braking force and the pull-back forces. Based upon the coefficient of friction between the chain and the chain reservoir the pull-back can be optimized to provide minimal force or pull. Minimum pull-back also makes removal of the cable trolley easier.

It is still another object of the braking system for a zip line for the brake to be quickly and easily reset using only gravity forces. When a zip liner makes contact with the brake they pull or lift chain from an angled reservoir. After the zip liner comes to a complete stop they remove the carriage from the zip line and gravity returns the chain and the brake mechanism.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
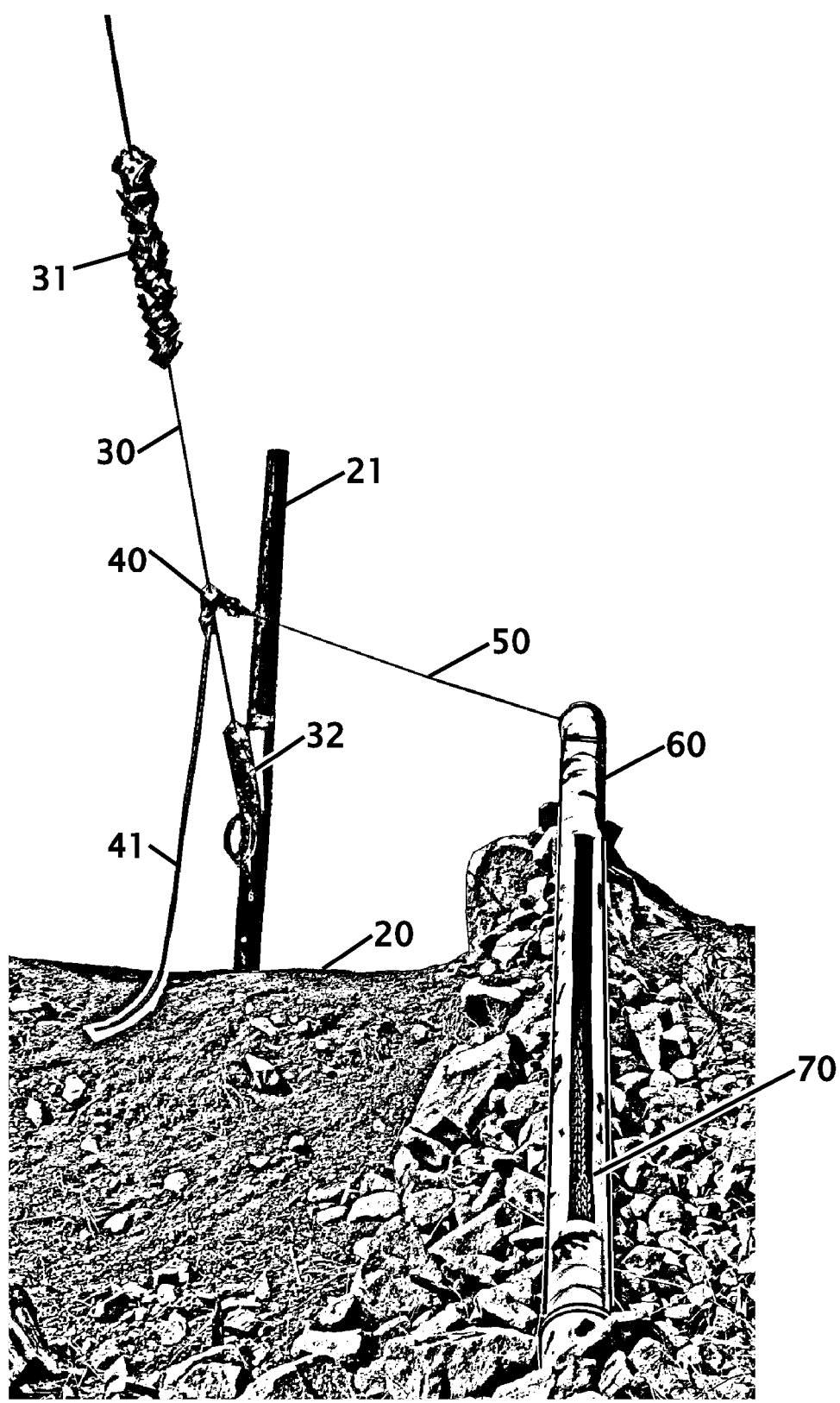
FIG. 1 shows a lower perspective view of a zip line with the braking system.
Figure 2:
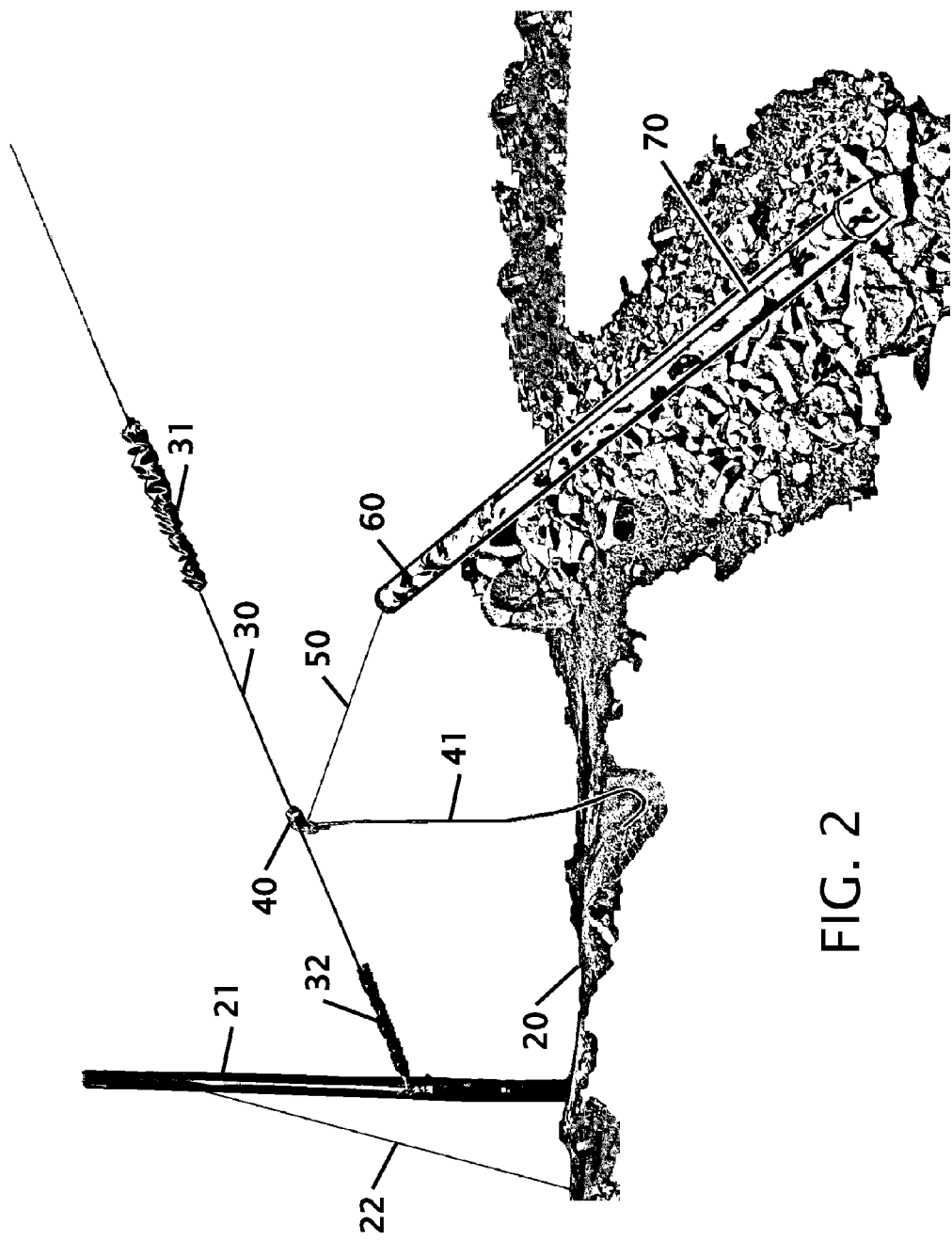
FIG. 2 shows a side perspective view of a zip line with the braking system.

FIG. 1 shows a lower perspective view of a zip line with the braking system and FIG. 2 shows a side perspective view of a zip line with the braking system these two figures should be viewed together to provide a better overall under of the various components of both the zip line 30 and the braking system as it is being used to slow and stop a person using the zip line 30 as the person approaches the end of the zip line 30 as they land on the landing platform or raised landing area 20. From these figures only one end of the zip line 30 is shown where the zip line 30 is secured to a pole 21 or other rigid structure that can support the pull that is exerted onto the cable 30. In FIG. 2 a guywire or tension wire 22 is shown to provide additional pull on the pole 21. The other end of the zip line 30 is secured to another pole or rigid anchor at an elevation that is above the pole 21 that is shown in these figures. Based upon the elevation difference between the two poles and the length of the cable 30 the velocity of the user of the zip line can be adjusted. When the user of the zip line approaches the landing area 20 their velocity will need to be brought to zero in a short distance and in a controlled manner to minimize the shock of deceleration.

When the user moves along the zip line 30 they will first make contact with some optional front buffers 31. These buffers provide some initial cushion for before the trolley (as shown in FIG. 5) makes contact with the slide block 40. The slide block 40 slides or rolls along the zip line cable 30. The slide block itself creates little of no drag on the zip line 30 and further creates virtually no abrasion to the zip line 30. A brake line 50 is secured to the slide block 40. The flexible leader brake line 50 is essentially a flexible rope that extends from the slide block 40 and into tube reservoir 60 where the flexible leader brake line 50 is secured to a chain 70. The chain 70 is collected in the bottom of the reservoir tube 60. Chain provides an ideal progressive load to slow and stop movement of the slide block 40. If a user overshoots the landing area 20 because of their weight, wind or because they start with a faster speed a set of back buffers 32 will further provide cushioning before the slide block 40 makes contact with the pole 21. An optional control line 41 is connected to the slide block 40 and allows for some control of the slide block 40 to provide additional braking and or to return the slide block to a preferred starting location. As a user makes contact with the slide block the motion will begin to lift the chain 70 from the reservoir tube 60. Additional disclosure of the reservoir tube 60 and the chain 70 is shown and described with FIGS. 3 and 4.

Figure 3:
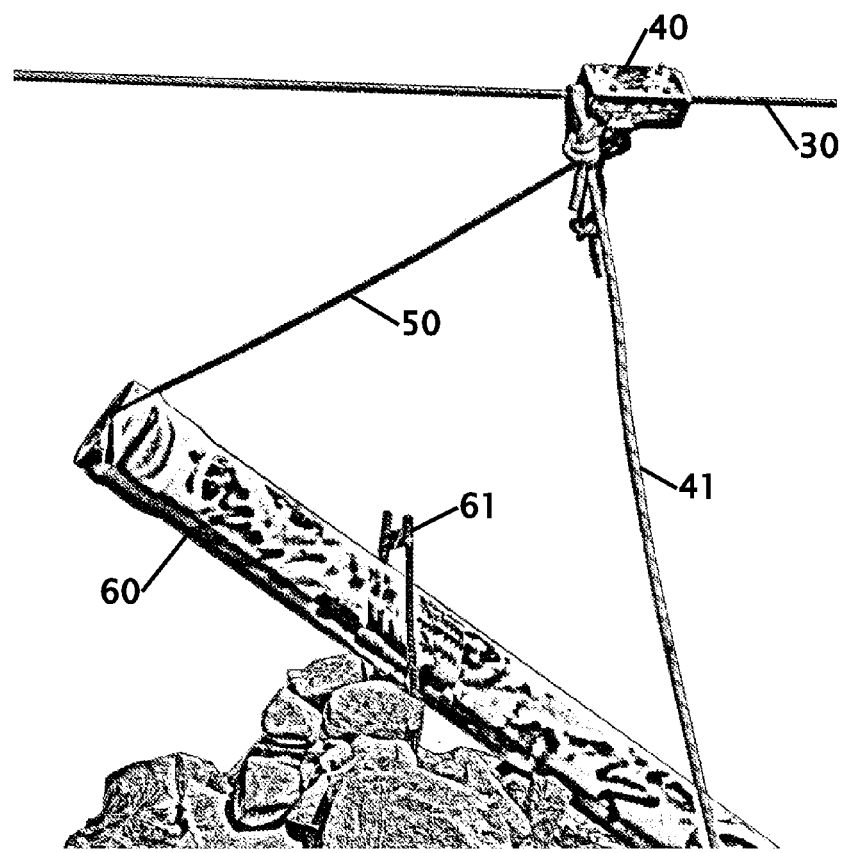
FIG. 3 shows a side perspective view of the brake reservoir tube.
Figure 4:
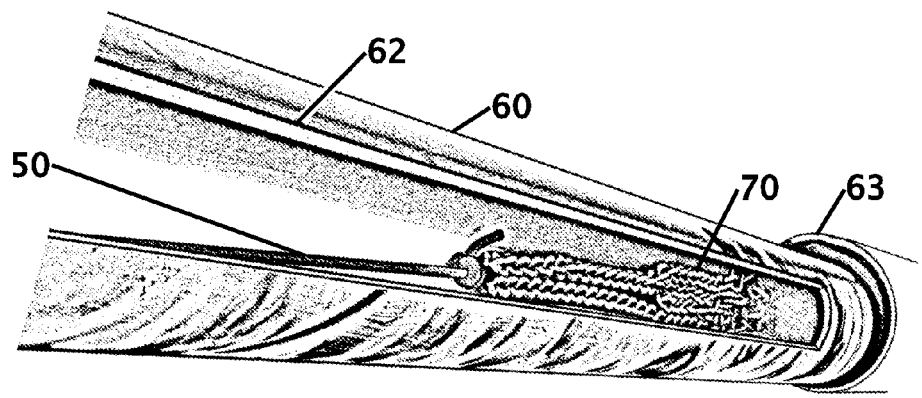
FIG. 4 shows a view looking into the reservoir tube showing the chain reservoir.

FIG. 3 shows a side perspective view of the brake reservoir tube and FIG. 4 shows a view looking into the reservoir tube showing the chain reservoir. These two figures provide the relationship of the braking system for a zip line in the preferred embodiment. The slide block 40 is shown on the zip line 30 with control line 41 secured around the zip line 30 and in front of the slide block 40. The flexible leader brake line 50 extends from the slide block 40 and into the reservoir tube 60 in FIG. 3. A tube support 61 prevents side movement of the reservoir tube as the flexible leader brake line 50 pulls on the side of the reservoir tube 60 and further maintains the reservoir tube at a desirable angle.

Chain provides a preferred progressive load because a single link of chain provides minimal stopping load but as the chain 70 is lifted or slid through the reservoir tube 60 the number of links and the load/weight of the links increases to put a progressively greater load on the flexible leader brake line 50. The coefficient of friction of the chain 70 sliding along the reservoir tube provides additional stopping forces. The angle of the reservoir tube 60 to the horizon alters both the stopping force and the return force that retracts the chain 70 back into the reservoir tube 60. Chain further is ideal because most chains will not knot together when the chain is collectively bundled. Chain is also nearly impervious to degradation from dirt, sand rocks and other debris that falls into the reservoir tube 60. The angle of the reservoir tube has been varied between 30 and 50 with the ideal angle being around 40 degrees with the horizon to provide preferred braking and pull back forces. In FIG. 4 a large portion of the top of the reservoir 60 is shown cut open 62 to allow for viewing or maintenance of the chain 70 to ensure that the chain 70 has properly returned to a reset condition. A collection bucket 63 or similar feature can be removed from the bottom of the reservoir tube 60 to remove debris from the bottom of the reservoir tube 60.

Figure 5A:
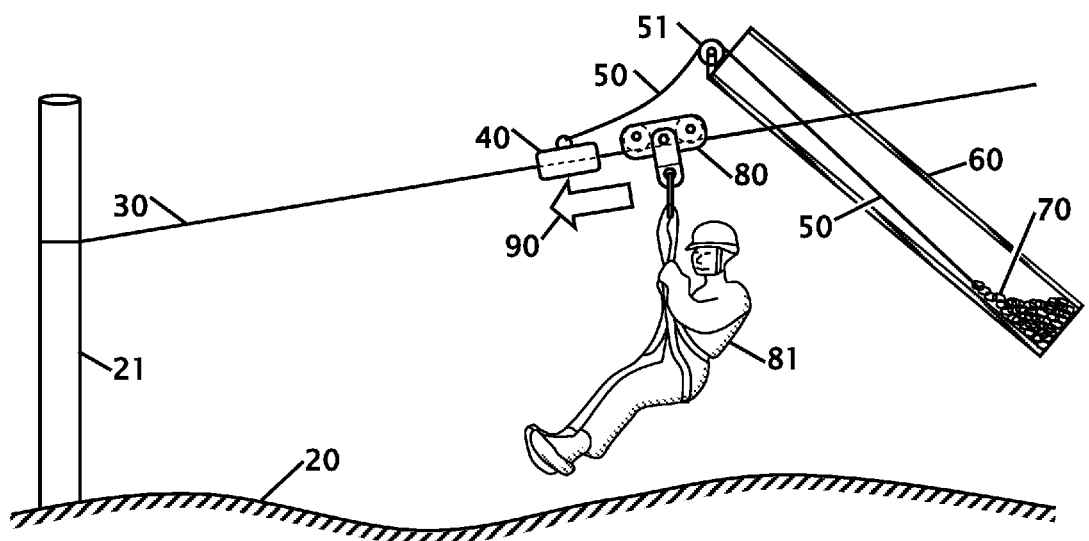
FIGS. 5A-5D shows the braking system for a zip line in use.
Figure 5B:
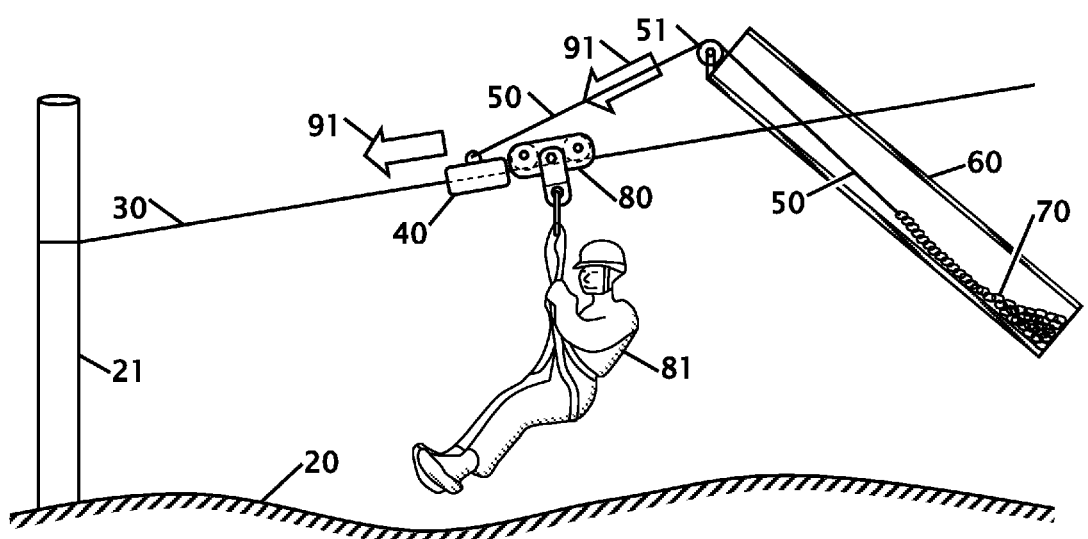
Figure 5C:
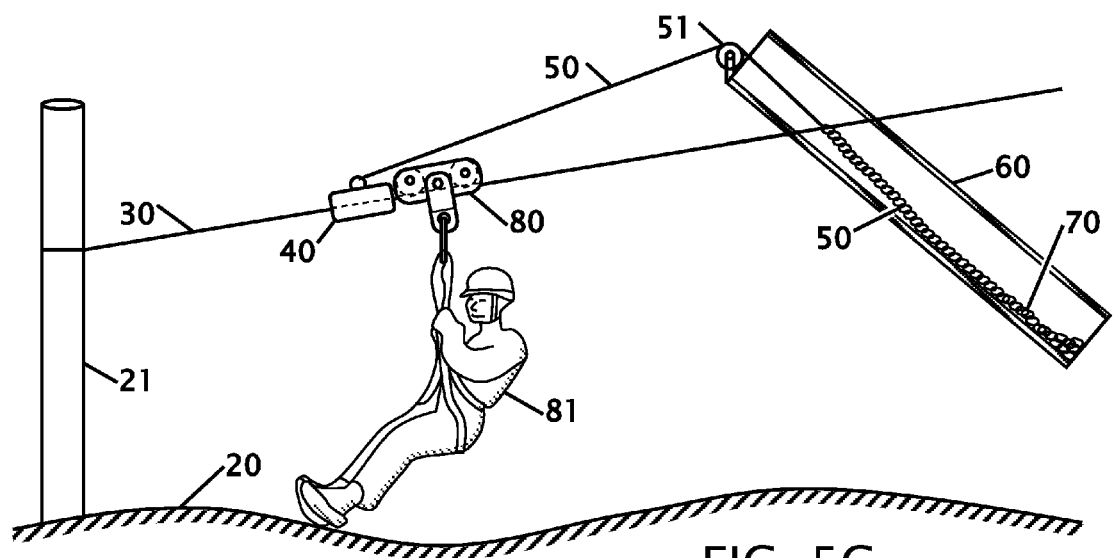
Figure 5D:
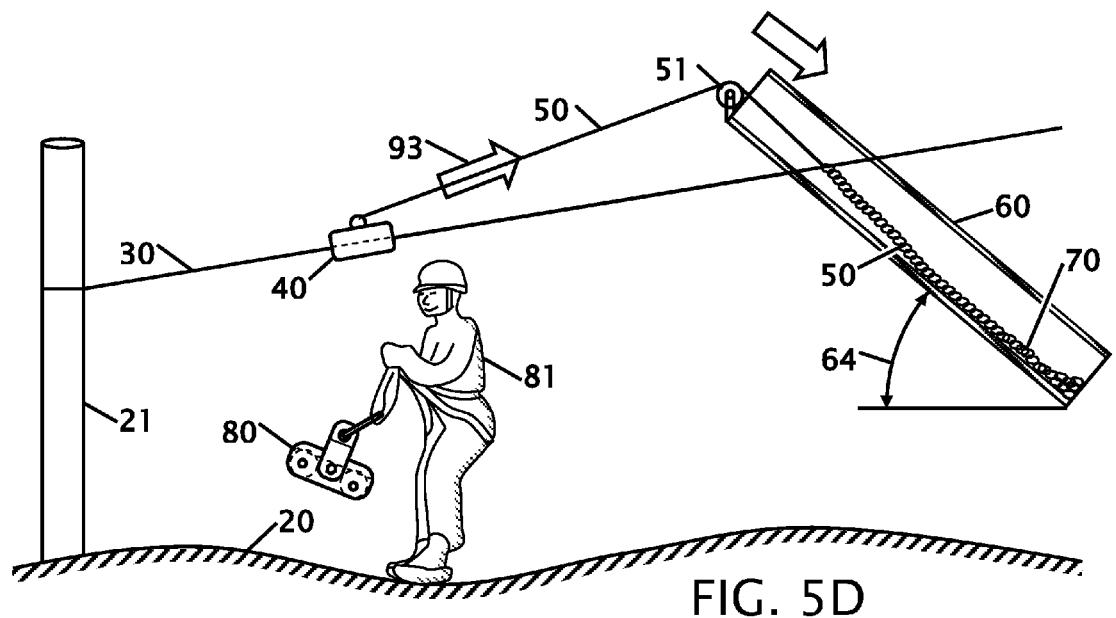

FIGS. 5A-5D shows the braking system for a zip line in use. From FIG. 5A the user 81 of the zip line 30 rolls down the zip line with kinetic energy as they are suspended on a cable trolley 80 that freely rolls on top of the zip line 30 that is secured to a pole 21 in approach 90 to the landing 20. Contact of the cable trolley 80 with the slide block 40 removes any slack from the flexible leader brake line 50 and the flexible leader brake line 50 pulls through an optional pulley 51 to lift the chain 70 as shown in FIG. 5B From FIG. 5B the motion 91 of the zip line user 81 has begun to slow as the cable trolley 80 pushed slide block 40 along the zip line as chain 70 is seen being lifted from the chain reservoir tube 60. In FIG. 5C the forward motion has been arrested because the force of additional links of chain 70 from the reservoir has offset the kinetic energy of the zip line user 81 and converted the kinetic energy into potential energy of the chain 70 resting at an incline within the reservoir tube 60. The zip line user 81 can stand on the landing 20 and remove the cable trolley 80 from the zip line 30. The angle 64 of the reservoir tube with the horizon in combination of the coefficient of friction between the chain 50 and the inside surface of the reservoir tube 60 pulls the chain 50 back to the rest condition where the flexible leader brake line 50 pulls 93 the slide block 50 back for preparation of the next zip line rider. At some shallow angles 64 the coefficient of friction of the chain 70 sliding along the reservoir tube 60 is equivalent to the potential energy of an extended chain 70 and the weight of the chain 70 is insufficient to pull 93 the slide block back to a reset position. At some elevated angles 64 the coefficient of friction of the chain 70 sliding along the reservoir tube 60 provides excessive pull back on the flexible leader brake line 50 and pulls back on the user 81 to pull them back out of the ideal landing position 20 and further making it difficult to remove the cable trolley from the zip line 30. The angle of the reservoir tube has been varied between 30 and 50 with the ideal angle being around 40 degrees with the horizon to provide preferred braking and pull back forces.

Thus, specific embodiments of a braking system for a zip line have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A braking system for a zip line comprising:
    a braking carriage on a zip line;
    said braking carriage is connected to a flexible leader;
    said flexible leader extends to links of chain and into an angled length of pipe that is angled from horizontal at an angle greater than a static coefficient of friction of said links of chain on said angled length of pipe and then into a collecting reservoir to a progressive load of links of chain wherein said progressive load is created by moving sequentially more weights that are resting within said collecting reservoir to said angled length of pipe and out of said angled length of pipe;
    an initial load is determined by initial links of chain that are displaced from said collecting reservoir;
    said progressive load is determined by a sum of said initial links of chain that are displaced from said collecting reservoir and by all additional links of chain that are displaced from said collecting reservoir;
    whereby when said braking carriage is moved along said zip line said progressive load increases with each said lifted sequential weight to provide braking of said braking carriage.

2. The braking system for a zip line according to claim 1 wherein said progressive load and said initial load provides a return force that retracts said links of chain to said collecting reservoir that returns said progressive load into said collecting reservoir.

3. The braking system for a zip line according to claim 1 wherein said angled length of pipe is set at an angle of between 30 and 50 degrees.

4. The braking system for a zip line according to claim 2 wherein said connected links of chain include both a length of chain existing in said collecting reservoir and collected at the bottom of said reservoir.

5. The braking system for a zip line according to claim 1 wherein said angled length of pipe guides said flexible leader to said sequentially more weights within said collecting reservoir.

6. The braking system for a zip line according to claim 5 wherein said angled length of pipe is between three and 18 inches in diameter.

7. The braking system for a zip line according to claim 1 wherein said angled length of pipe is between two feet and 20 feet in length.

8. The braking system for a zip line according to claim 1 wherein said flexible leader is a rope.

9. The braking system for a zip line according to claim 2 wherein said flexible leader connects to said at least one links of chain outside of said collecting reservoir.

10. The braking system for a zip line according to claim 2 wherein said at least one links of chain is straight link chain or twisted-link chain.

11. The braking system for a zip line according to claim 5 wherein at least a portion on the top of said angled length of pipe is open.

12. The braking system for a zip line according to claim 1 wherein said braking carriage is separate from a user zip line trolley or carriage.

13. The braking system for a zip line according to claim 3 wherein said angle of said angled length of pipe minimizes pull-back of said sequentially more weights back into said collecting reservoir.

14. The braking system for a zip line according to claim 3 wherein said angle of said angled length of pipe creates an increase of frictional drag on said at least one links of chain as additional links of chain make contact within said length of pipe.

15. The braking system for a zip line according to claim 1 wherein braking occurs predominantly as progressive amounts of said at least one links of chain are lifted from said collecting reservoir.

16. The braking system for a zip line according to claim 2 wherein said braking system is adjustable to alter the amount and rate of braking by changing the weight of said more than one link of chain.

17. The braking system for a zip line according to claim 1 wherein said progressive load is an elongated length of linked chain that is initially piled at a bottom of said collecting reservoir.

18. The braking system for a zip line according to claim 17 wherein said progressive load is created by forces of gravity as a greater length of linked chain is lifted from said pile of links of chain.

* * * * *